Figure 1:
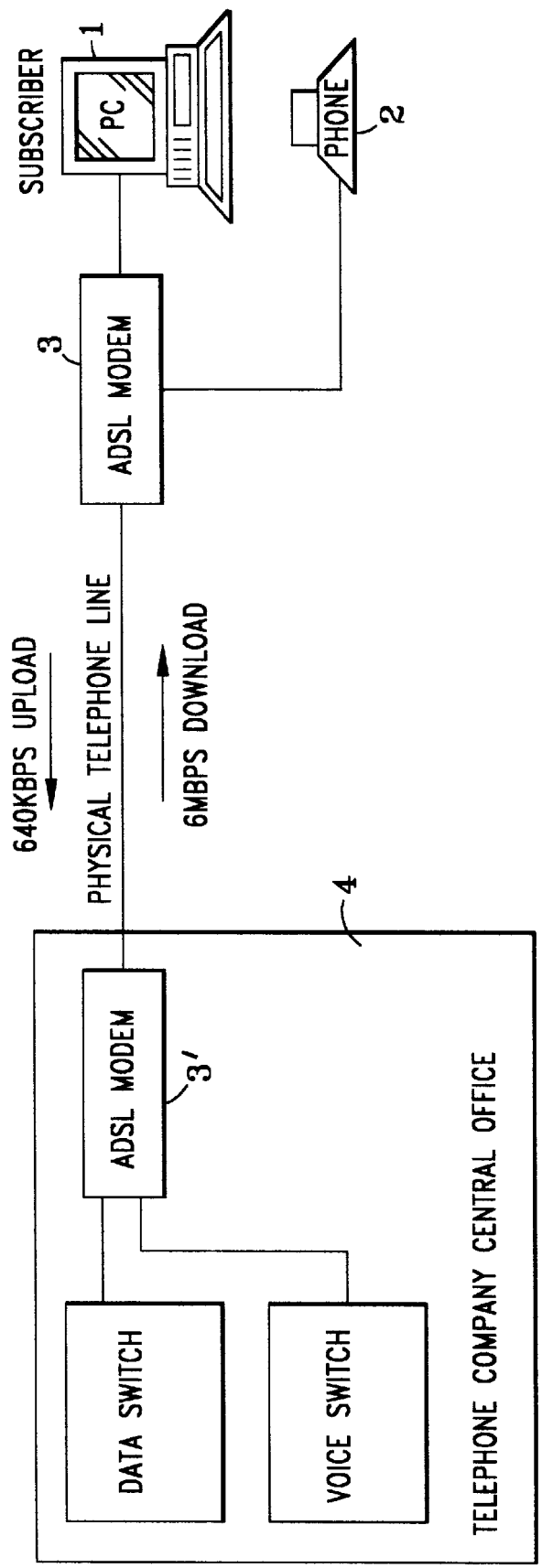

United States Patent [19]
Chatter

[11] Patent Number: 6,069,879
[45] Date of Patent: May 30, 2000

[54] METHOD OF AND SYSTEM ARCHITECTURE FOR HIGH SPEED DUAL SYMMETRIC FULL DUPLEX OPERATION OF ASYMMETRIC DIGITAL SUBSCRIBER LINES

[76] Inventor: Mukesh Chatter, 6 Gina Dr., Hopkinton, Mass. 01748

[21] Appl. No.: 08/746,671

[22] Filed: Nov. 14, 1996

[51] Int. Cl.$^7$ ..................................................... H04L 5/14
[52] U.S. Cl. ........................... 370/295; 370/437; 370/468
[58] Field of Search ................................... 370/276, 282, 370/283, 284, 285, 286, 287, 288, 289, 290, 292, 293, 465, 468, 477, 294, 295, 431, 437; 379/93.01, 93.26, 93.28, 93.31, 93.33, 93.34; 375/222

[56] References Cited

U.S. PATENT DOCUMENTS

| | | | |
|---|---|---|---|
| 4,890,316 | 12/1989 | Walsh et al. | 370/93.33 |
| 5,117,423 | 5/1992 | Shepherd et al. | 370/280 |
| 5,177,734 | 1/1993 | Cummiskey et al. | 370/290 |
| 5,214,650 | 5/1993 | Renner et al. | 370/276 |
| 5,343,515 | 8/1994 | Treffkorn | 379/93.33 |
| 5,579,305 | 11/1996 | Norrell et al. | 370/286 |
| 5,594,491 | 1/1997 | Hodge et al. | 348/7 |
| 5,896,372 | 4/1999 | Auerbach et al. | 370/282 |

*Primary Examiner*—Chi H. Pham
*Assistant Examiner*—Kwang B. Yao
*Attorney, Agent, or Firm*—Rines and Rines

[57] ABSTRACT

A novel architecture for high speed dual symmetric full duplex operation of otherwise asymmetrical telephone subscribers—central office modems that provide relatively high data rate downloading from the telephone central office but relatively low data rate uploading from the subscriber stations, whereby, through direction swapping by such duplex operation, equal downloading and uploading can be achieved, or other increasing or grate swapping or variation of the uploading rate capability, as desired. ADSL modems in particular, being reconfigured to provide symmetrical rate downloading and uploading and/or configured direction assignment of rates.

16 Claims, 5 Drawing Sheets

DUAL SYMMETRIC DSL(DSDSL) MODEM INTERFACE OVER TWO TELEPHONE LINES

A TYPICAL ADSL INSTALLATION OVER A STANDARD TELEPHONE LINE

AN EXAMPLE: A TYPICAL DSDSL INSTALLATION OVER
6 STANDARD TELEPHONE LINES

A TYPICAL T3 INSTALLATION, CONVENTIONAL SOLUTION

METHOD OF AND SYSTEM ARCHITECTURE FOR HIGH SPEED DUAL SYMMETRIC FULL DUPLEX OPERATION OF ASYMMETRIC DIGITAL SUBSCRIBER LINES

The present invention relates to digital modems operating with current telephone lines to permit the transmission and reception of both voice and data on the same line simultaneously, being more particularly directed to asymmetric digital telephone subscriber lines interconnecting a telephone central office and subscriber telephones as associated, for example, with personal computers and the like, for enabling relatively high speed downloading operation from the central office to the subscriber and relatively low speed for subscriber uploading to other subscribers via the central office.

BACKGROUND OF INVENTION

The Internet has revolutionized the way networks are affecting corporate and home users. The growth in Internet is explosive and the number of users are estimated to be 40 to 50 million worldwide, and rapidly growing. Most of the home subscribers use analog modems, operating at 9600 bps to 33 kbps, to connect to the telephone company network. Analog modems are too slow, however, and make surfing the world wide web very time consuming, leading to frustration and diminished utility. Most of the users also turn off the graphics, because of the time required to transfer the images over the networks. There is, accordingly, an urgent need and demand by the subscribers to upgrade the line speed, but analog modems do not have much room to grow.

This has caused some vendors, including Amati, Aware, Analog Devices and Motorola, to develop and promote new types of digital modems which operate on the existing telephone lines (also called twisted copper pair or simply "twisted pair") and allow both the voice and data to travel on the same line simultaneously and at high speeds. These digital modems collectively have been named 'xDSL' (Digital Subscriber Line). 'xDSL' includes 'ADSL', 'HDSL', and 'VDSL'. The most prominent and promising among them is 'ADSL' (Asymmetric Digital Subscriber Line) operating at a relatively high speed of 6 mbps from the telephone company central office to the user, and operating at a lower speed of 640 kbps from the user to the telephone company central office, and thus, named asymmetrical. The reason for asymmetry in speed is that signal integrity can not be maintained if both directions run at the same high speed.

This is being promoted as the answer to all the frustration of the Internet users. The large scale deployment of this technology is expected to start in late 1997 and then grow exponentially in years to come.

Telephone companies prefer the 'ADSL' as it allows them to use the existing telephone lines already connected to the homes and offices for voice, and yet simultaneously use them for data transfer, thereby saving cost.

'ADSL' standards have been approved and chip sets and modems are available, but such also has a major disadvantage; namely, that there is operation at high speed only one way, from the central office to the subscriber (download), which, however, is generally acceptable for a large number of subscribers, as most of the information is downloaded from the Internet to one's own computer. This, however, leaves out subscribers who also need to transfer significant data at high speed to the other subscribers (upload). The list of such users include:

Small Internet Service Providers(ISPs) who provide the information to the users, and need to transmit data at higher speed, not lower, as allowed with ADSL technology.

Subscribers whose speed requirements (the preferred data transfer direction for the high speed channel) vary, such as someone who needs frequently to transfer large files (upload) to the central office for subsequent transmission to another subscriber on the network. The upload speed offered by the ADSL, as before mentioned, is 640 kbps from subscriber premises to the central office, which is roughly 10 times slower than the download speed Corporate networks where data usage pattern is similar in both the directions optimally requiring symmetrical speeds.

There has heretofore been no solution for these problems caused by the asymmetric nature of the ADSL. ISPs are required to lease from phone companies, very high speed dedicated channels to support their operations and at a very high cost. The subscribers with need to upload large files must continue to encounter a long delay, and the corporate networks simply use either dedicated leased lines or frame relay services, each of which is highly expensive.

The ADSL definition, therefore, appears to assume that most of the data flows from the central office to the subscribers, and thus matches the usage pattern of such a large number of subscribers.

What is not well served, however, as previously pointed out, are users with opposing data flow pattern needs requiring high speed from the users to the central office and low speed from the central office to the subscribers, or equal speed in both directions. A careful analysis of the ADSL reveals this technical limitation that both transmit and receive operations can not operate at high speed, though the actual assignment of low and high is not rigid.

The present invention is directed to overcoming these limitations with ADSL systems and doing so:

a. by dynamically configuring direction assignment of high speed channel and low speed channel; and/or b by creation of a full duplex high speed channel and a full duplex low speed channel.

In the case of dynamically configurable speed assignment, the same physical line is used, but the uploading speed is swapped with the downloading speed by dynamically altering the digital signal processor parameters.

The preferred or best mode implementation requires the two existing telephone lines and then transforms them into two virtual lines (or also virtual twisted pair), each operating as a full duplex line. This, in effect, admirably connects the asymmetric speed ADSL into a virtual symmetric speed system by providing the capability of duplex swapping directions of the relatively high and low speed channels.

OBJECTS OF INVENTION

The primary object of the invention, thus, is to provide a new and improved method of and system architecture for digital modem control of simultaneous voice and data flow between and amongst telephone subscribers and central offices that shall not be subject to the above-described and other limitations of current systems, including the asymmetry of data flow uploading and downloading direction rates.

A further object is to provide a novel technique of connecting the asymmetric data rate flow over the telephone lines into a novel virtual symmetric data rate operation through high speed dual symmetric full duplex operation.

An additional object is alternatively to enable the dynamic configuring direction assignment of high speed and low speed channels, as desired.

Other and further objects will be described hereinafter and are more fully delineated in the appended claims.

SUMMARY

In summary, however, from one of its important aspects, the invention embraces a method of improving asymmetric digital subscriber telephone line (ADSL) modem interfacing amongst subscribers and a central telephone office(s) in which voice and data are simultaneously exchanged and with downloading from the central office to the subscriber at a relatively high data rate and uploading from the subscriber at an asymmetric relatively low rate, that comprises, substantially equalizing the downloading and uploading data rates by providing full duplex high speed and low speed channels and transforming the telephone line into two virtual lines, each operating as a full duplex line, whereby the resulting swapping of direction of data exchange of the high and low speed channels produces a virtual symmetric high speed data rate for both uploading and downloading and a virtual symmetric low speed data rate for both uploading and downloading.

Preferred and best mode embodiments and designs are hereinafter more fully presented.

DRAWINGS

Figure 2:
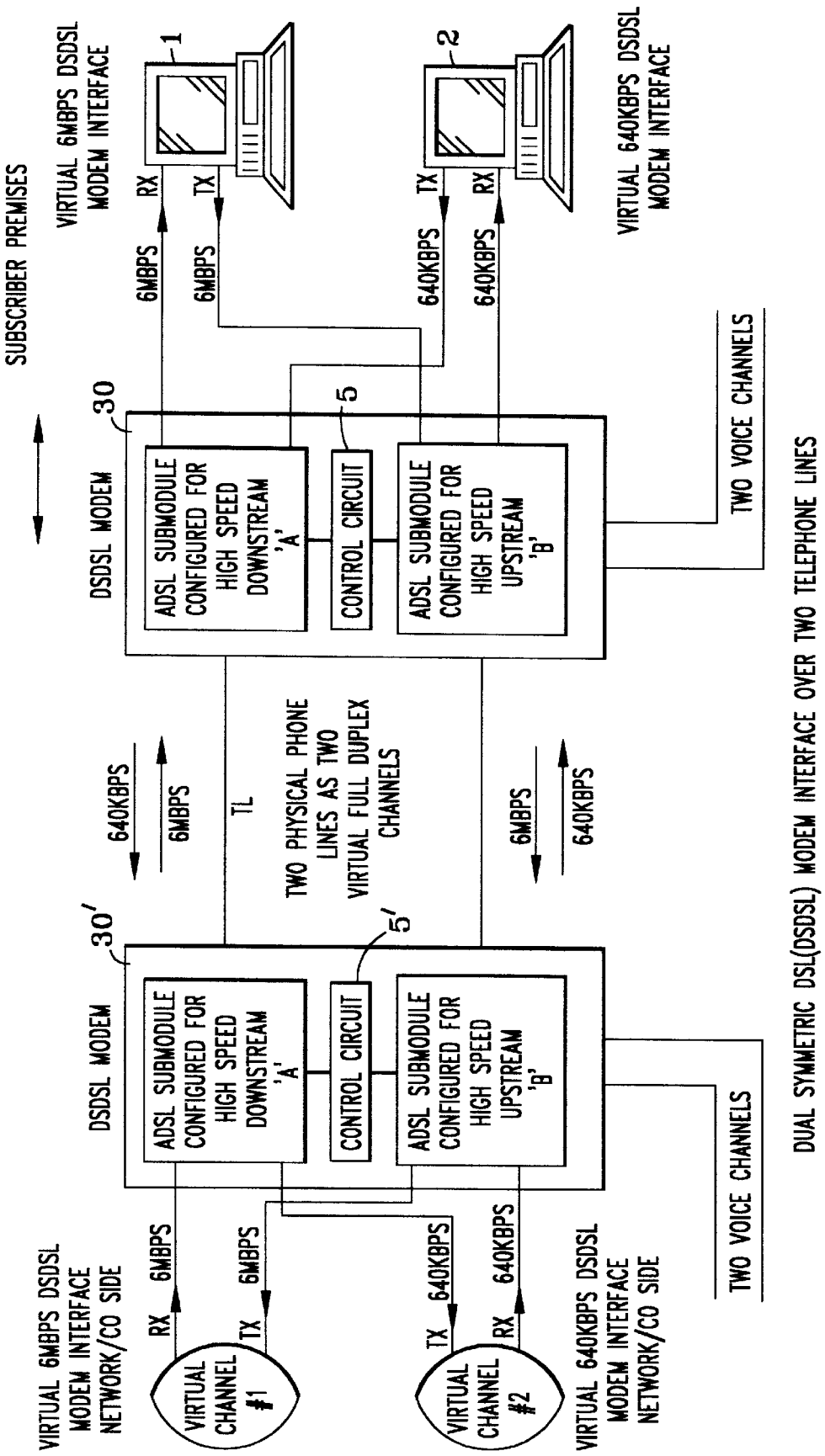
Figure 3:
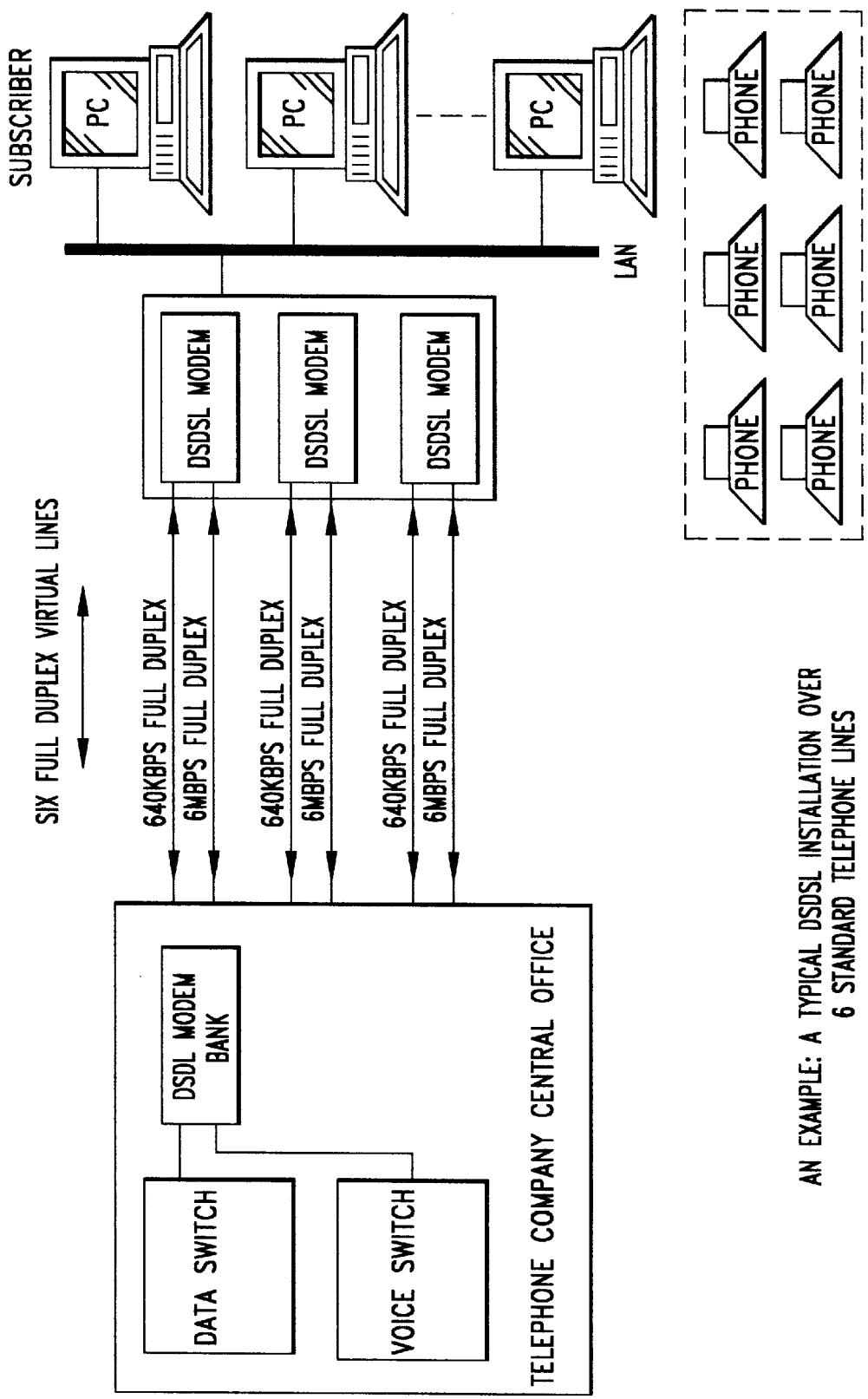
Figure 4:
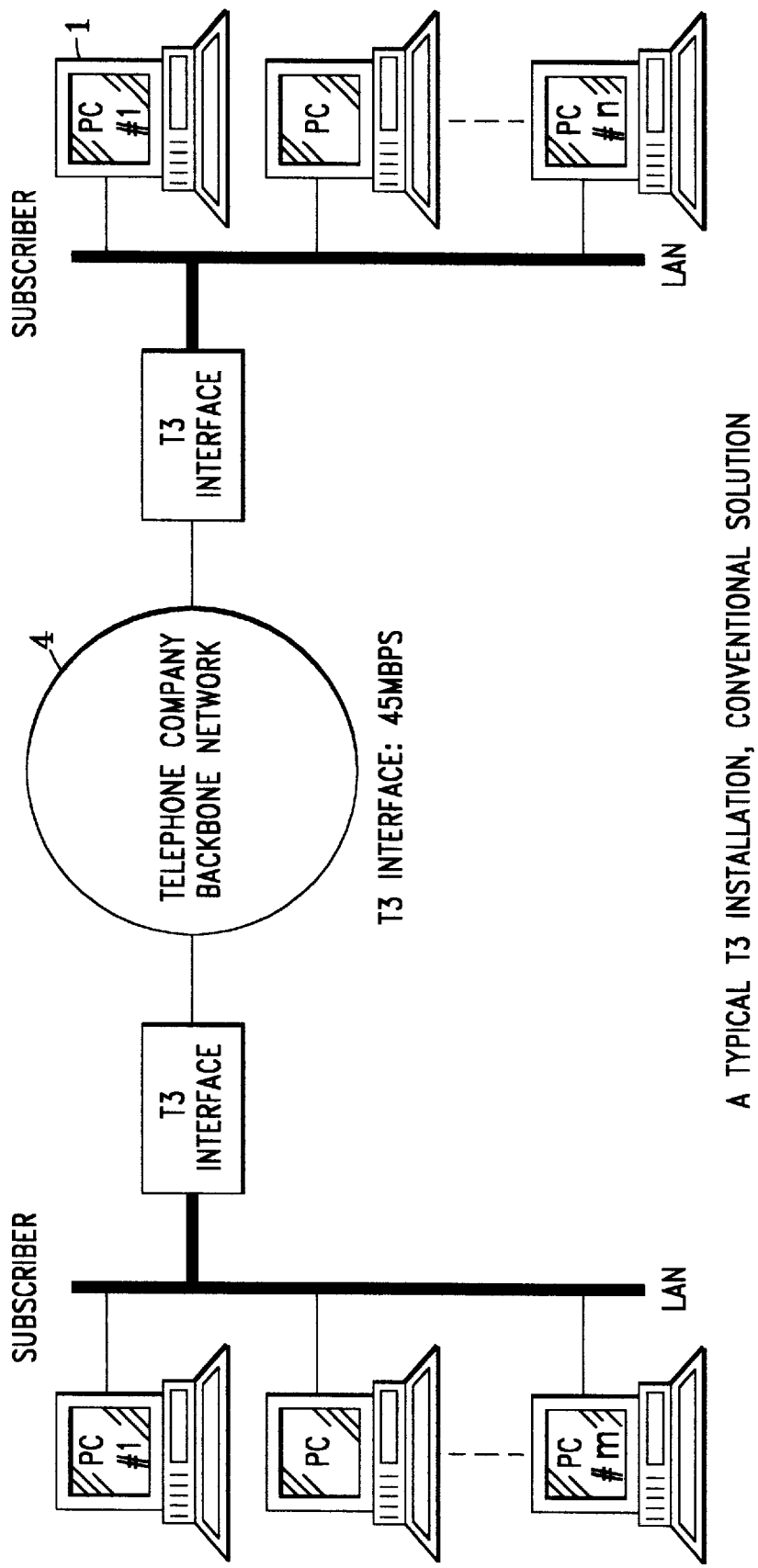
Figure 5:
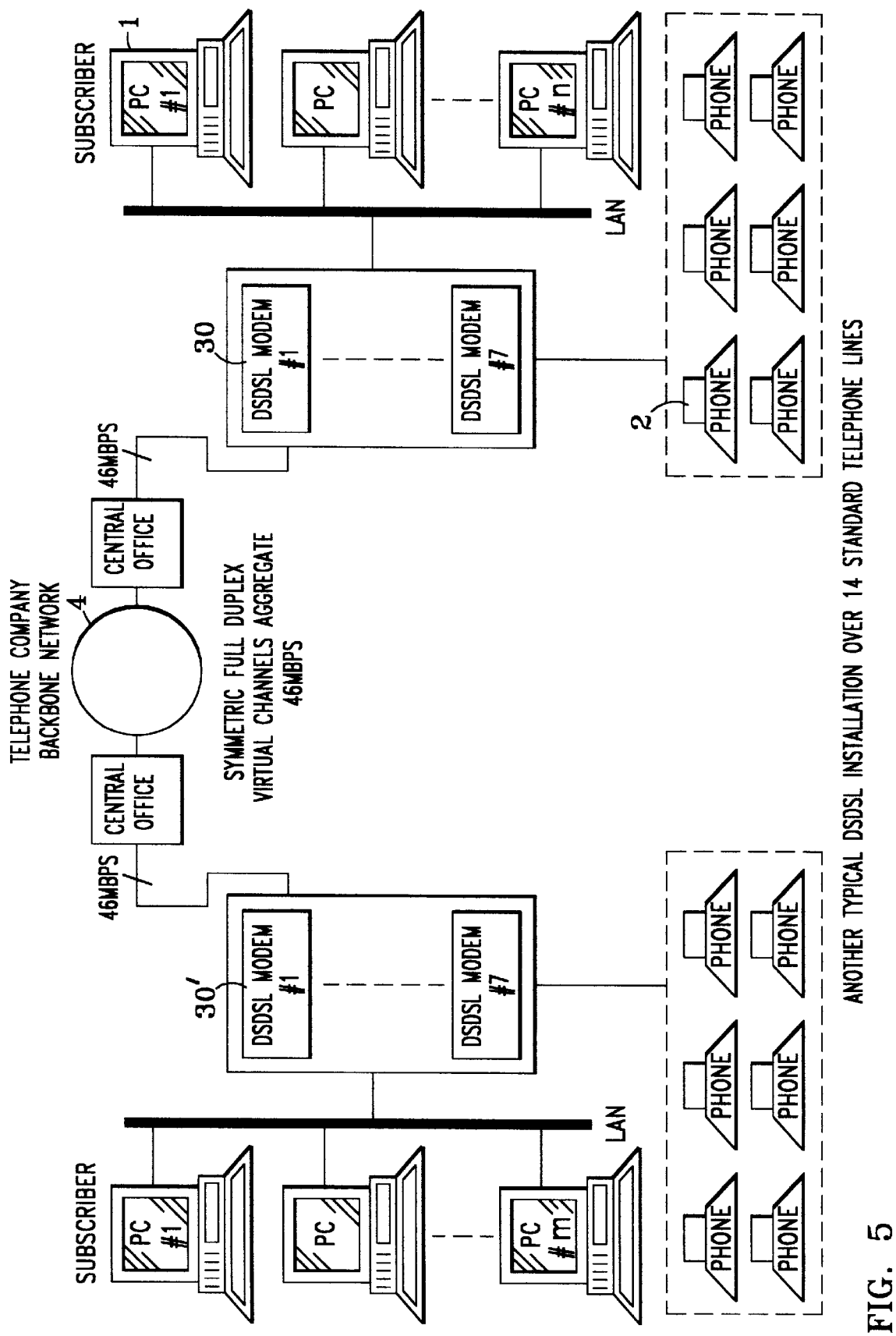

The invention will now be described in connection with the accompanying drawings, FIG. 1 of which is a block diagram of a typical ADSL installation over a standard telephone line system; and FIG. 2 is a similar diagram of a preferred form of the invention, connecting systems such as shown in FIG. 1 into a dual symmetric DSL modem interface (DSDSL);

FIG. 3 illustrates further details for an exemplary installation over 6 standard telephone lines; and FIGS. 4 and 5 are block diagrams illustrating a system employing a typical T3 telephone installation for interfacing computer subscribers over the telephone network, and such a system modified in accordance with the invention, respectively.

PREFERRED EMBODIMENTS(s) OF THE INVENTION

In FIG. 1, for purposes of contrast, a typical ADSL prior art installation is presented showing a subscriber PC station 1 having its telephone 2 connected through an ADSL modem 3 and a telephone line TL to the telephone company central office 4 containing data and voice switching functions operating over a corresponding ADSL modem 3', and with the asymmetric data flow rates above-described.

The capability provided by the invention to dynamically swap the direction of the high speed channel with the low speed channel is most useful for subscribers who may have differing usage patterns subject to the application. Since the ADSL chip sets use digital signal processors as primary means of filtering, it is possible to swap the direction of the speed by loading different coefficients at the command of the user.

The conversion of such ADSL systems to provide the virtual symmetry of the present invention with its attendant advantages before-described, is illustrated in the diagram of FIG. 2, with the ADSL modems 3 and 3' of FIG. 1 replaced by DSDSL modems 30 and 30' of the invention, the term DSDSL meaning Dual Symmetric DSL modem.

In this approach, two ADSL sub-modules are used in each DSDSL modem 30,30' such that one module (labelled 'A') provides a high speed upload channel and corresponding low speed download channel, while the second module (labelled 'B') operates with a low speed upload channel and a high speed download channel. The transmitter TX of module 'A' is coupled with the receiver RX of module 'B', and the receiver RX of module 'A' is coupled with the transmitter TX of module 'B'. This architecture uses both the physical twisted pairs to create two virtual twisted pairs, each operating at full duplex speeds, one high and one low. Since each DSDSL modem employs two common physical ADSL channels to create two symmetric virtual channels, it has to consider the line characteristics of each physical line (which can vary significantly) to determine the operating speed of each virtual channel. Therefore both the sub modules 'A' and 'B' must operate at the speeds permissible by the characteristics of both the physical lines.

As an example, if one line permits 6 mbps high speed while the other line characteristics only allow 5 mbps high speed, then the resulting full duplex high speed virtual channel will operate at 5 mbps. A control circuit 5(5') is provided between the two sub modules to communicate and share the parameters on a dynamic basis.

In the conventional configuration, ADSL modems are also installed at the central office as shown in FIG. 1 and each physical twisted pair is assigned a unique IP address. In the above-described DSDSL solution of the invention, each virtual twisted pair is assigned a unique IP address (or any other mechanism allowing unique addressing of each virtual channel), rather than each physical twisted pair. This is an important distinction.

These solutions provided by the invention have wide ranging implications for networking.

In a typical multi site network, a high speed local area network (LAN) is used for local computers. Relatively slower speed but expensive connections are used to link the sites which are geographically apart, thus creating a wide area network. It is the slower interconnects between the various sites, which causes substantial network performance degradation and does not allow a cost effective wide area network operating at LAN comparable speeds for all its users from any physical geographical location.

Considering, for example, that Ethernet, a local area network protocol runs at 10 mbps, and Token ring, another local area network protocol operates at 16 mbps, this DSDSL based solution of the invention provides much higher speeds at significantly lower cost. Typical wide area network protocol such as frame relay, operates in the range of 64 kbps to 2 mbps and at much higher cost. Therefore, the DSDSL based network architecture will, in effect, extend the local area network inexpensively such that users at either side will not know the difference. This, therefore, removes the distinction between local area and wide area networks and truly provides a Global Area Network (GAN). The availability of multiple channels carrying the load also makes the network security better as some of the virtual channels can be exclusively assigned for sensitive information. In a delay sensitive network environment, some channels can be assigned to the higher priority traffic, thus reducing the bottlenecks.

As an illustration, consider a small company having 6 telephone lines and a network implementation using the DSDSL solution of the invention, as shown in FIG. 3. In this case, three full duplex virtual channels are provided at 6 mbps each(this may go higher as technology improves)

aggregating to 8 mbps; and 3 virtual channels at 640 kbps each, resulting in a total of roughly 2 mbps. The net result is that 20 mbps bandwidth is available to the company at very low cost (anticipated to be $50 a month per twisted pair, and thus $300 per month for 6 lines). To gain the same bandwidth today on the other hand, one has to spend 3 to 4 thousand dollars.

In another example, a company has two offices, one, say, in Boston and another at San Jose, and each has 14 existing phone lines, as shown in FIG. 4. Each office has its own local area network and uses the 'T3' services (45 mbps) offered by the telephone company to connect the two offices, an expensive conventional wide area network solution. If the network architecture between the two offices is implemented with the DSDSL approach of the invention, as shown in FIG. 5, seven virtual full duplex channels providing a total of 42 mbps are available. Seven additional low speed full duplex virtual channels are also available with a total aggregate of 4.2 mbps. Thus the total bandwidth available between the two sites is over 46 mbps. This is more bandwidth than 'T3' which additionally requires special installation, whereas the DSDSL lines are already in place. The cost for a T3 service today is in the order of $10,000 a month as compared to the DSDSL solution of the invention, expected to be in the $700 a month range.

In addition to being highly expensive, a failure on the conventional T3 line causes major havoc in the network operation, directly affecting the business. In contrast, by virtue of having data distributed across multiple virtual channels, the novel DSDSL approach also provides fault tolerance. If one of the virtual channels goes down (thus effectively taking both the associated low and high speed virtual channels of the corresponding DSDSL modem out of service), the other channels will continue to operate and hence provide graceful degradation.

As stated earlier, in the existing approach, an ADSL modem at the subscriber side has a counterpart at the central office. Typically, the subscribers are at physically different locations, but the central office ADSL modems are at one place connecting to a switch. For cost reduction purposes, efforts are underway by various vendors to design a multi-channel ADSL modem such that it can interface with multiple subscriber modems at a lower cost by sharing logic. It should be noted that this conventional ADSL multichannel modem, however, does not alter its inherent asymmetric speed definition. Such a multichannel modem can also be installed at the site of a subscriber who has, for example, 8 lines or more (the exact number is dependent on the cost benefit structure determined by the vendors).

The concept of the DSDSL of the invention, as explained earlier, involves two physical twisted pair telephone lines. This DSDSL modem uses the line characteristics of two lines to determine the full duplex speed; and if one of the lines is in much worse shape than the other, the previously described performance degradation of the full duplex virtual channels will occur. As before discussed, if one line can achieve a maximum rate of 6 mbps while the other one can only provide 5 mbps, the overall virtual channel speed will be 5 mbps, (This presumes that identical speeds are desired on both ends, which may not be necessarily true in all the cases).

An additional improvement can also be made in a multichannel (more than 2 physical lines) implementation of the present invention. The improvements can be achieved by pairing the physical lines for optimal performance such that the lines with most matching characteristics are paired to create two virtual channels, and then the next two lines, and so on. As an illustrative example, consider 8 physical lines. In a conventional DSDSL model, a multichannel modem will pair lines 1 & 2, 3 & 4, 5 & 6, 7 & 8 to create 8 full duplex virtual channels (4 high speed and 4 low speed). In the improved multichannel DSDSL modem, line characteristics of all 8 lines are analyzed for the optimal pairing at the two physical lines which can provide the best full duplex performance; then the next two lines are paired, and so on. This idea of 'LINE PAIRING' results in better aggregate performance than the performance otherwise feasible.

The above architecture of the invention thus solves the full duplex channel problem as outlined above. The ADSL chip sets are designed with digital signal processors and thus permit high level of programmability.

A potential application of this DSDSL invention is in developing countries, where telephone lines are in real shortage and are very expensive. The 6 mbps and 640 kbps full duplex scapability of the two virtual channels can be used to provide 110 inexpensive voice channels of 64 kbps each per two physical phone lines. The voice quality is not expected to be as good due to the packet transfers but will be sufficient. If voice is transferred as cells (in case of ATM), then the quality problem also disappears. At the subscribers side, repeaters are required to load the line with such large number of users.

A similar approach is also applicable for other asymmetric solutions such as the newly proposed 56 kbps asymmetric analog modem by US Robotics, and further modifications will also occur to those skilled in this art, such being considered to fall within the spirit and scope of the invention as defined in the appended claims.

What is claimed is:

1. A method of improving asymmetric digital subscriber telephone line modem interfacing amongst subscribers and a central telephone office in which voice and data are simultaneously exchanged and with downloading from the central office to the subscriber at a relatively high data rate and uploading from the subscriber at an asymmetric relatively low rate, that comprises, substantially equalizing the downloading and uploading data rates by providing full duplex high speed and low speed channels and transforming the telephone lines into two virtual lines, each operating as a full duplex line, whereby the resulting swapping of direction of data exchange of the high and low speed channels produces virtual symmetric high speed and low speed data rates for both uploading and downloading.

2. A method as claimed in claim 1 and in which the telephone lines comprise "twisted pairs" and the virtual lines, virtual "twisted pairs", and the further step is performed of assigning a unique address to each virtual "twisted pair".

3. A method as claimed in claim 1 and in which pairs of ADSL modules are exchanged with one module of the pair providing a relatively high speed upload channel and correspondingly relatively low speed downloading channel, and the other module of the pair providing a relatively low speed upload channel and a relatively high speed download channel; and coupling the data transmission of said one module with the receiving of the other module and coupling the receiving of said one module with the transmission of said other module.

4. In a digital subscriber telephone line modem system interfacing amongst subscribers, and a central office and in which voice and data are simultaneously exchanged and with downloading from the central office to the subscribers at a relatively high data rate and uploading from the subscriber at an asymmetric relatively low rate, apparatus for increasing the uploading rate having, in combination, modems having connections for data transmitting and receiving interfacing of the subscribers and the central office comprising a pair of ADSL modules, one module of the pair providing a relatively high speed upload channel and a corresponding relatively low speed download channel, and the other module of the pair providing a relatively low speed upload channel and a relatively high speed download channel; means for coupling the data transmitting connection of said one module with the receiving connection of the other module and for coupling the receiving connection of said one module with the transmitting connection of said other module; and means for duplexing the high and low speed channels to provide virtual symmetric relatively high speed and low speed data operation for both uploading and downloading through the duplexing high and low speed channel direction swapping.

5. Apparatus as claimed in claim 4 and in which the telephone lines comprise physical "twisted pairs", and means is provided for transforming the "twisted pairs" into virtual "twisted pairs" and for assigning a unique address to each virtual "twisted pair" as distinguished from physical "twisted pair".

6. Apparatus as claimed in claim 4 and in which each pair of ADSL modules is provided with a control circuit intermediate and connected with the modules of the pair for communicating and sharing information on the line transmission characteristics and parameters on a dynamic basis.

7. Apparatus as claimed in claim 6 and in which the relatively low channel data rate is of the order of about 640 kbps and the relatively high channel data rate is of the order of about 6 mbps.

8. Apparatus as claimed in claim 6 and in which pluralities of subscriber computer stations are connected by LAN to a plurality of said pairs of ADSL modules and provided with telephone instruments connected therethrough to a central office.

9. Apparatus as claimed in claim 8 and in which the duplexing means enables of the order of above 46 mbps of full duplexing of high and low data rate channels.

10. Apparatus as claimed in claim 6 and in which the modem(s) is connected to interface with local area network, such as, one of the Ethernet, Token ring and the Internet to improve one or more of higher data rates and local area network extension.

11. In a telephone line modem system interfacing amongst subscribers and a central telephone office and in which information is asymmetrically downloaded from the central office to the subscribers at a relatively high rate and uploaded from the subscriber at an asymmetric relatively low rate, apparatus for increasing the uploading rate having, in combination, modems having connections for information transmitting and receiving and interfacing the subscribers and the central office and comprising a pair of asymmetric modem modules, one module of the pair providing a relatively high speed upload channel and a corresponding relatively low speed download channel, and the other module of the pair providing a relatively low speed upload channel and a relatively high speed download channel; means for coupling the transmitting connection of the said one module with the receiving connection of the other module and for coupling the receiving connection of the said one module with the transmitting connection of said other module; and means for duplexing the high and low speed channels to produce virtual symmetric relatively high speed and low speed operation for both uploading and downloading through the duplexing high and low speed channel direction swapping.

12. Apparatus as claimed in claim 5 and in which multi pairs of modems are employed to provide multi virtual channels with corresponding "twisted pair" lines, and means is provided for pairing those lines with the most similar transmission characteristics to create first virtual channels, and then pairing the next most matching characteristics lines to create the next virtual channels, and so on, thereby to provide optimum full duplex performance.

13. Apparatus as claimed in claim 11 and in which said modems are digital.

14. Apparatus as claimed in claim 11 and in which said modems are analog.

15. A method of improving asymmetric digital subscriber telephone line modem interfacing amongst subscribers and a central telephone office in which voice and data are simultaneously exchanged along high speed and low speed channels and with downloading in the direction from the central office to the subscriber at a relatively high data rate and uploading in the opposite direction from the subscriber at an asymmetric relatively low rate, that comprises dynamically configuring the direction assignments of the high and low speed channels to achieve, swap, and relatively vary the high and low data rates of uploading and downloading as desired by the user.

16. In a telephone line modem system interfacing amongst subscribers and a central telephone office(s) and in which information is asymmetrically downloaded in the direction from the central office to the subscribers at a relatively high rate and uploaded in the opposite direction from the subscriber at an asymmetric relatively low rate, apparatus for increasing the uploading rate and, more generally, varying uploading and downloading rates at the desire of the user, said apparatus having, in combination, modems having connections for information transmitting and receiving and interfacing the subscribers and the central office and means for dynamically configuring the direction assignment of the high and low speed channels to achieve, swap, and relatively vary the high and low data rates of uploading and downloading as desired.

* * * * *